US012691942B2

(12) United States Patent
Zalanka et al.

(10) Patent No.: US 12,691,942 B2
(45) Date of Patent: Jul. 28, 2026

(54) SPACE FRAME KINETIC NODE CASTING

(71) Applicant: Caterpillar Inc., Peoria, IL (US)

(72) Inventors: David O. Zalanka, Mt Zion, IL (US);
Thomas J. Rood, Oreana, IL (US);
Timothy D. Harman, Decatur, IL (US)

(73) Assignee: Caterpillar Inc., Peoria, IL (US)

( * ) Notice: Subject to any disclaimer, the term of this
patent is extended or adjusted under 35
U.S.C. 154(b) by 405 days.

(21) Appl. No.: 18/367,470

(22) Filed: Sep. 13, 2023

(65) Prior Publication Data

US 2025/0083746 A1     Mar. 13, 2025

(51) Int. Cl.
B62D 21/02     (2006.01)
B62D 27/02     (2006.01)
B62D 33/02     (2006.01)

(52) U.S. Cl.
CPC ........... B62D 21/02 (2013.01); B62D 27/023
(2013.01); *B62D 33/02* (2013.01)

(58) Field of Classification Search
CPC ...... B62D 21/02; B62D 21/08; B62D 21/186;
B62D 23/005; B62D 27/023; B62D 33/02
See application file for complete search history.

(56) References Cited

U.S. PATENT DOCUMENTS 4,045,075 A * 8/1977 Pulver .................... B62D 21/08
280/798
4,660,345 A * 4/1987 Browning ............. B62D 21/08
164/63

4,735,355 A * 4/1988 Browning .............. B62D 21/08
228/175
6,389,697 B1 5/2002 Benoit et al.
7,322,106 B2 1/2008 Marando et al.
9,702,137 B2 7/2017 Larsen et al.
9,731,773 B2 8/2017 Gami et al.
10,183,706 B2 1/2019 Miller et al.
(Continued)

FOREIGN PATENT DOCUMENTS

DE      102015014363 A1 * 5/2017 ............. B29C 70/48
EP           3632777 A1 * 4/2020 ........... B62D 23/005
(Continued)

OTHER PUBLICATIONS

US 9,809,265 B2, 11/2017, Czinger et al. (withdrawn)
(Continued)

*Primary Examiner* — Lori Lyjak
(74) *Attorney, Agent, or Firm* — Xsensus

(57)     ABSTRACT

A center upper frame node connector, which can be a
casting, can comprise: a forward horizontal upper frame
node oriented in a first forward direction; a rearward hori-
zontal upper frame node oriented in a first rearward direction
opposite the first forward direction; a rearward angular
upper frame node oriented in a second rearward direction
and a first downward direction; a vertical upper frame node
oriented in a second downward direction; and a first con-
nection pad on a first side of the upper frame node casting
and a second connection pad on a second side on upper
frame node connector opposite the first side. The center
upper frame node connector can be coreless, that is, without
any hollow portions at any of the frame nodes and either of
the first and second connection pads.

20 Claims, 5 Drawing Sheets

(56)                      References Cited

U.S. PATENT DOCUMENTS

| | | |
|---|---|---|
| 11,040,648 B2 | 6/2021 | Miller et al. |
| 11,130,524 B2 | 9/2021 | Miller |
| 11,235,806 B2 | 2/2022 | Miller et al. |
| 11,235,808 B2 | 2/2022 | Miller et al. |
| 11,358,641 B2 | 6/2022 | Miller |
| 2015/0210319 A1* | 7/2015 | Tiramani ............. B62D 21/183 |
| | | 296/205 |
| 2017/0050677 A1* | 2/2017 | Czinger ............... B62D 29/048 |
| 2017/0305471 A1 | 10/2017 | Gami et al. |
| 2020/0223485 A1 | 7/2020 | Wang |
| 2021/0122418 A1 | 4/2021 | Miller et al. |
| 2021/0122421 A1 | 4/2021 | Miller |

FOREIGN PATENT DOCUMENTS

| | | |
|---|---|---|
| JP | 2022088447 A | 6/2022 |
| WO | 2015089550 A1 | 6/2015 |
| WO | 2019/223935 A1 | 11/2019 |

OTHER PUBLICATIONS

US 9,895,747 B2, 02/2018, Czinger et al. (withdrawn)
Written Opinion and International Search Report for Int'l. Patent
Appln. No. PCT/US2024/041871, mailed Dec. 3, 2024 (10 pgs).

* cited by examiner

SPACE FRAME KINETIC NODE CASTING

TECHNICAL FIELD

The present disclosure relates to space frames, and more particularly to center upper frame node connections, and systems, components, and methods thereof.

BACKGROUND

Conventional haul trucks, such as off-highway rear haul trucks, may use welded steel frames that can be extremely heavy and may require many meters of welding to fabricate a completed frame. Space frames offer a lighter and stronger alternative to traditional welded steel frames, since far less steel is required. As a result, space frames offer considerable benefits in terms of cost, manufacturability, and performance. For example, haul trucks with space frames comparatively can haul larger payloads and consume less fuel.

Conventional space frame structures may use fabricated nodal connections. Such nodal connections may be used to create space frame structures associated with static applications. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain. Carefully designed high-strength castings and fabrications can be required to provide appropriate stiffness and flexibility characteristics while insuring proper load transfer from the dump body to the wheels.

U.S. Pat. No. 10,183,706 ("the '706 patent") describes a node for interconnecting frame members of a frame, where the node includes a single piece node body. According to the '706 patent, a plurality of cup-shaped node connectors are disposed on the node body, where each of the node connectors include a closed end attached to the node body and an open end opposite the closed end and extending away from the node body.

SUMMARY

In one aspect a center upper frame node connector, which can be a casting, can be provided or implemented. The center upper frame node connector can comprise: a forward horizontal upper frame node oriented in a first forward direction; a rearward horizontal upper frame node oriented in a first rearward direction opposite the first forward direction; a rearward angular upper frame node oriented in a second rearward direction and a first downward direction; a vertical upper frame node oriented in a second downward direction; and a first connection pad on a first side of the upper frame node casting and a second connection pad on a second side on upper frame node connector opposite the first side. The center upper frame node connector can be coreless, that is, without any hollow portions at any of the frame nodes and either of the first and second connection pads.

In another aspect a space frame, for instance, for an off-highway rear haul truck, can be provided or implemented. The space frame can comprise: a first center upper frame node casting; and a second center upper frame node casting spaced from the first center upper frame node casting in a width direction of the space frame, wherein each of the first and second center upper frame node castings can be coreless and can include: a forward horizontal upper frame node oriented in a first forward direction and configured to weldably attach to a center upper horizontal frame connection, a rearward horizontal upper frame node oriented in a first rearward direction and configured to weldably attach a first frame tube, a rearward angular upper frame node oriented in a second rearward direction and a first downward direction and configured to weldably attach a second frame tube, a vertical upper frame node oriented in a second downward direction and configured to weldably attach a third frame tube, and a first connection pad on a first side of the upper frame node casting and a second connection pad on a second side on upper frame node casting opposite the first side, one of the first connection pad or the second connection pad being configured to weldably attach a fourth frame tube, and the other of the first connection pad or the second connection pad being configured to remain free of any welded attachments. Coreless can mean that at least each of the first and second center upper frame node castings has a body free of any hollow portions at any of the frame nodes and either of the first and second connection pads.

In yet another aspect a method can be implemented. The method can comprise: providing a center upper frame node connector, which may be a casting, of a space frame; and providing a plurality of frame tubes, including a first frame tube, a second frame tube, a third frame tube, and a fourth frame tube. The center upper frame node connector can include: a forward horizontal upper frame node oriented in a first forward direction and configured to weldably attach to a center upper horizontal frame connection of the space frame, a rearward horizontal upper frame node oriented in a first rearward direction and configured to weldably attach the first frame tube, a rearward angular upper frame node oriented in a second rearward direction and a first downward direction and configured to weldably attach the second frame tube, a vertical upper frame node oriented in a second downward direction and configured to weldably attach the third frame tube, and a first connection pad on a first side of the center upper frame node connector and a second connection pad on a second side on center upper frame node connector opposite the first side, at least one of the first connection pad or the second connection pad being configured to weldably attach the fourth frame tube. The center upper frame node connector can be coreless, without any hollow portions at any of the frame nodes and either of the first and second connection pads.

DETAILED DESCRIPTION

Embodiments of the present disclosure can involve or be directed to one or more center upper frame node connections, and systems, components, and methods thereof.

Figure 1:
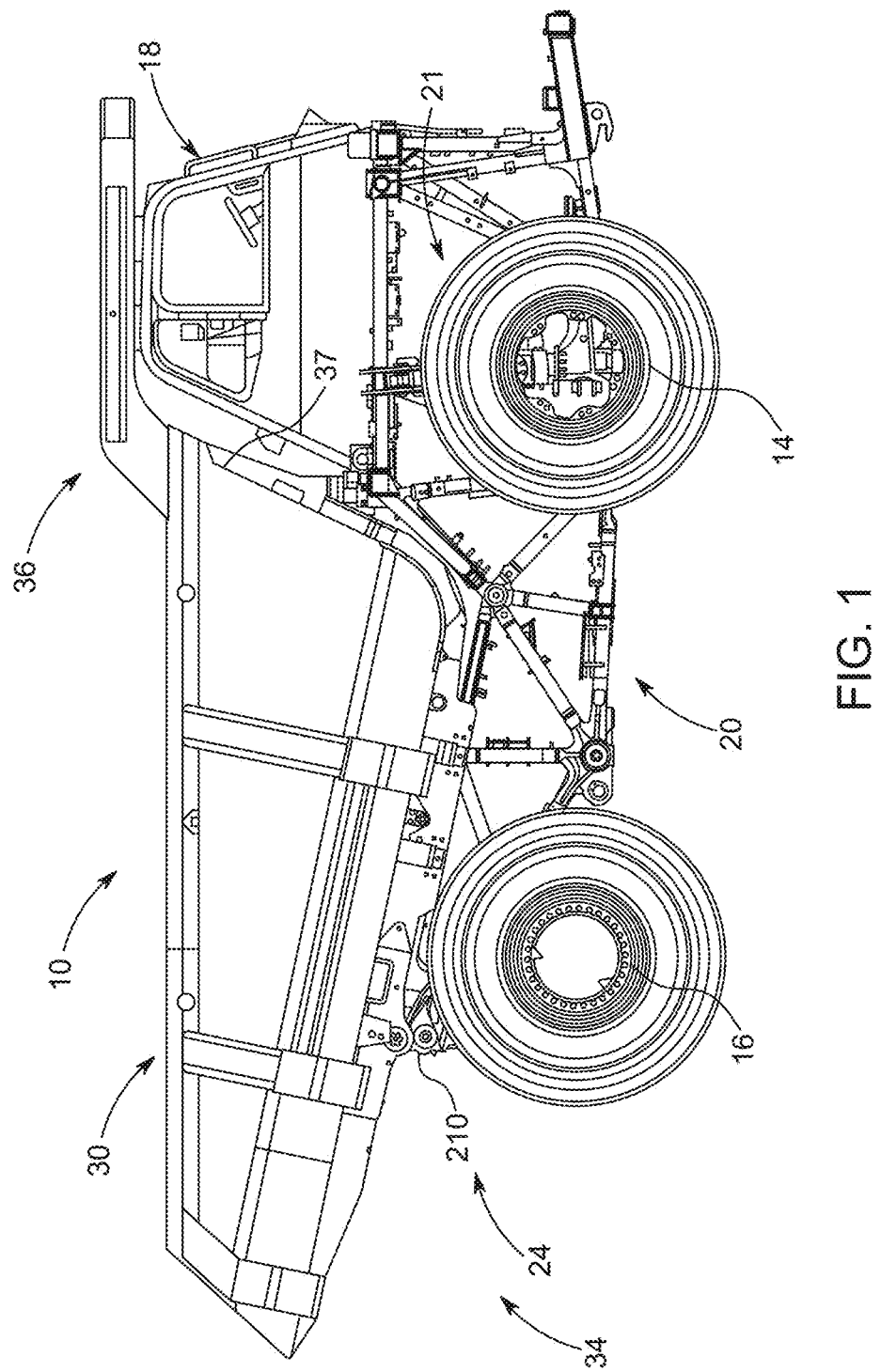
FIG. 1 is a side view of a machine according to embodiments of the disclosed subject matter.

Referring now to the drawings and with specific reference to FIG. 1, this figure illustrates an exemplary embodiment of a machine 10. Machine 10 may be a mobile machine that performs some type of operation associated with an industry such as mining, construction, or any other industry known in the art. For example, as shown in FIG. 1, machine 10 may be an earth moving machine, particularly, an off-highway rear haul truck.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20 at a front of the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover supported by the space frame 20. Generally, the prime mover may be provided in a space 21 of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train to transfer motive power to move the front and/or rear wheels 14, 16 in a forward or rearward direction.

Exhaust from the prime mover may be output from one or more exhaust outputs. Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 2:
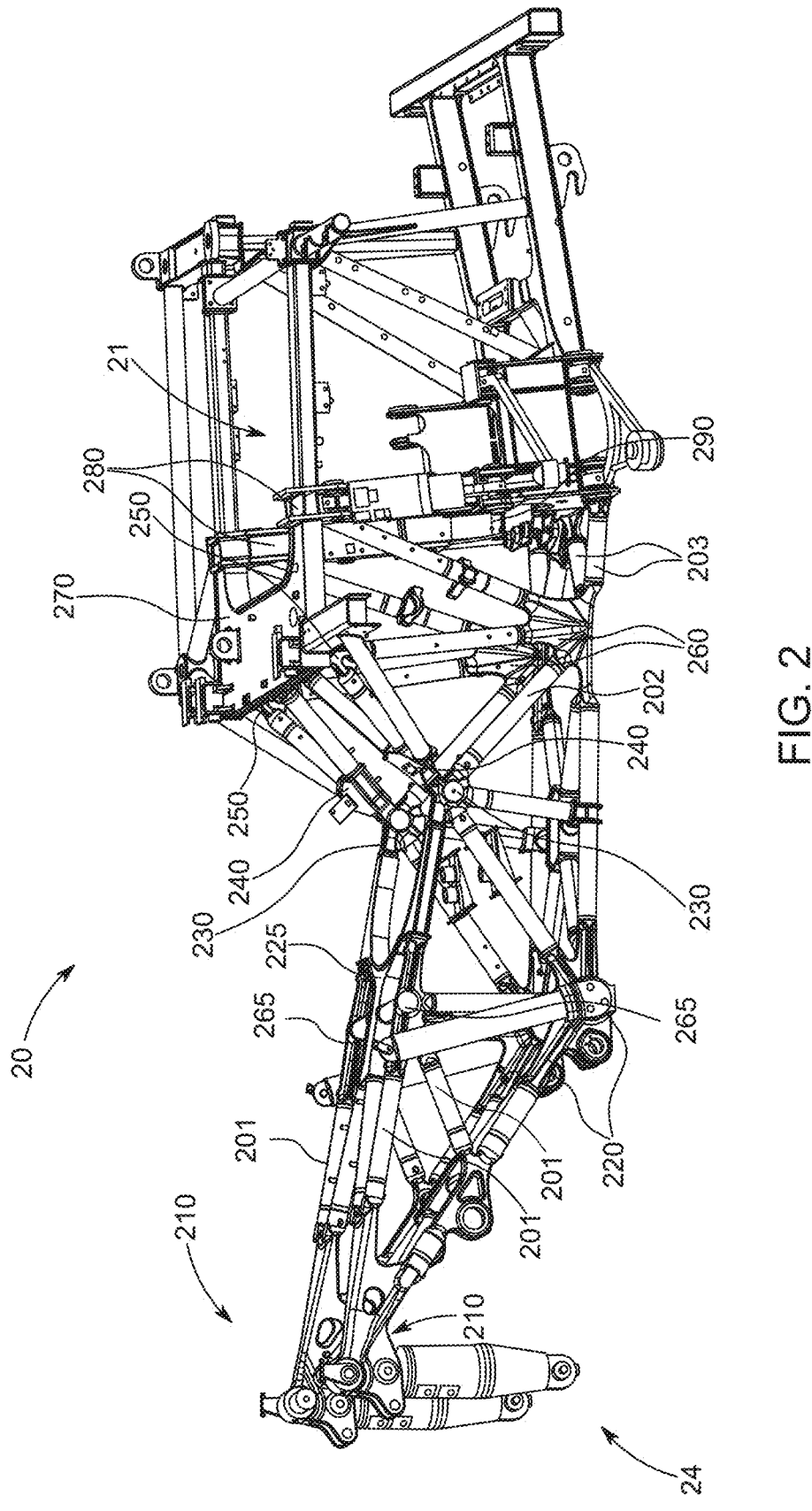
FIG. 2 is a side view of a space frame according to embodiments of the disclosed subject matter.

FIG. 2 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a pair of center upper frame node connections 265, a front upper frame connection 270, a pair of front upper suspension connections 280, and a front lower suspension connection 290. Though the foregoing connections are described as pairs, the connections of a pair may not be identical. For instance, the connections of a pair may be symmetrical, generally, but not necessarily identical. The foregoing connections can be castings or fabrications. In general, a casting may refer to a connection that is not welded to another support component of the space frame 20, and a fabrication may refer to a connection that is welded to another support component of the space frame 20.

The space frame 20 can also include a plurality of elongate support members, such as elongate support members 201, elongate support members 202, and elongate support members 203. Elongate support members, according to embodiments of the disclosed subject matter, can be in the form of rods and/or tubes, circular, for instance, where some or all of the rods and/or tubes may be solid or hollow.

Figure 3:
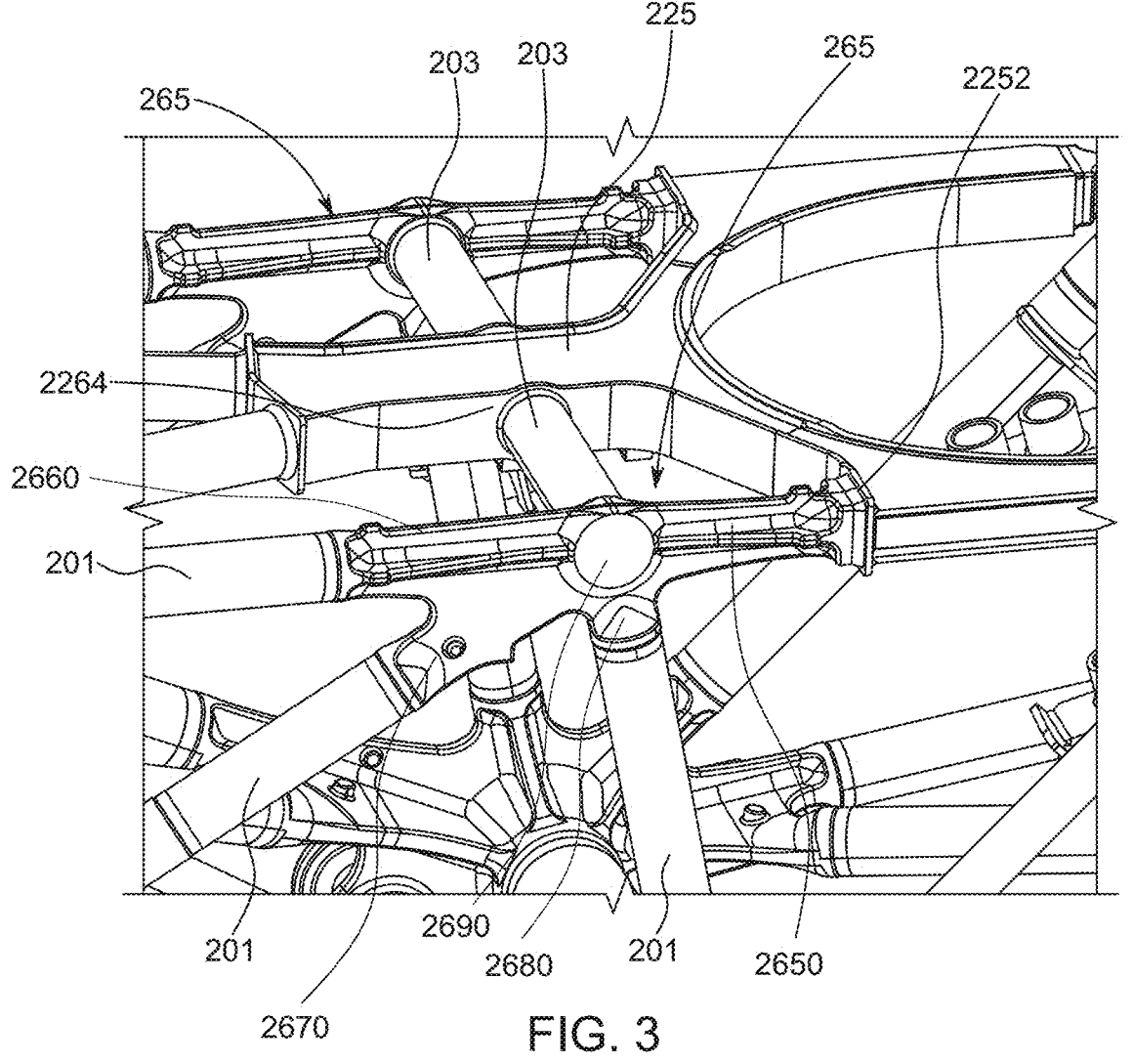
FIG. 3 shows a frame node according to one or more embodiments of the present disclosure, implemented in the space frame of FIG. 2.

Referring now to FIG. 3, this figure shows a close-up view of one of the center upper frame node connections 265, which may be regarded as a center upper frame node connector or casting. FIG. 3 also shows a portion of the other center upper frame node connection 265, which also may be regarded as a center upper frame node connector or casting. The center upper frame node connections 265 can be spaced apart from each other in a width direction of the space frame 20. Generally, each center upper frame node connection 265 can be fixedly (e.g., welded) connected or coupled to the center upper frame connection, three elongate support members 201, and one elongate support member 203. In general, each of the center upper frame node connections 265 can be regarded as having a K-shape in a side elevational view thereof.

The center upper frame node connection 265 can include a forward horizontal upper frame node 2650, a rearward horizontal upper frame node 2660, a rearward angular upper frame node 2670, and a vertical upper frame node 2680. The center upper frame node connection 265 can also include a pair of contact or connection pads 2690, where a first connection pad 2690 can be on a first side of the center upper frame node connection 265 and a second connection pad 2690 can be on a second side of the center upper frame node connection 265 opposite the first side.

Here, each of the forward horizontal upper frame node 2650, the rearward horizontal upper frame node 2660, the rearward angular upper frame node 2670, and the vertical upper frame node 2680 can extend from a body or base 2600 of the center upper frame node connection 265 having the first and second connection pads 2690. That is, each of the forward horizontal upper frame node 2650, the rearward horizontal upper frame node 2660, the rearward angular upper frame node 2670, and the vertical upper frame node 2680 can have a longitudinal axis that passes through the body or base 2600 of the center upper frame node connection 265 having the first and second connection pads 2690.

As shown in FIG. 2 and FIG. 3, the forward horizontal upper frame node 2650 can be oriented in a first forward direction and fixedly attached (e.g., via welding) to a rearward frame connection boss 2252 of the center upper horizontal frame connection 225. The first forward direction may be regarded as a first horizontal direction, which may be entirely or substantially entirely (e.g., +/− five degrees) horizontal. The rearward horizontal upper frame node 2660 can be oriented in a first rearward direction and fixedly attached (e.g., welded) to an end of frame tube 201. This frame tube 201 may be regarded as a first frame tube. The first rearward direction may be regarded as a first horizontal direction, which may be entirely or substantially entirely (e.g., +/− five degrees) horizontal.

Still referring to FIG. 2 and FIG. 3, the rearward angular upper frame node 2670 can be oriented in a second rearward direction and a first downward direction and fixedly attached (e.g., welded) to an end of another frame tube 201. This frame tube 201 may be regarded as a second frame tube. An angle between the rearward horizontal upper frame node 2660 and the rearward angular upper frame node 2670 can be acute, for instance, thirty-five degrees. Such angle may be regarded as a first angle. Additionally or alternatively, an angle of the rearward angular upper frame node 2670 with respect to horizontal can be acute, for instance, thirty-five degrees.

The vertical upper frame node 2680 can be oriented in a second downward direction and fixedly attached (e.g., via welding) to an end of yet another frame tube 201. This frame tube 201 may be regarded as a third frame tube. The second downward direction can be forward relative to vertical, such as five to ten degrees forward of vertical, according to one or more embodiments of the present disclosure. An angle between the vertical upper frame node 2680 and the forward horizontal upper frame node 2650 can be acute, for instance, eighty degrees. Such angle may be regarded as a second angle. Thus, according to one or more embodiments, the second angle can be greater than the first angle discussed in the preceding paragraph. Additionally or alternatively, an angle of the vertical upper frame node 2680 with respect to horizontal can be acute, for instance, eighty degrees. An angle between the vertical upper frame node 2680 and the rearward angular upper frame node 2670 can be acute, whereas an angle between the vertical upper frame node 2680 and the rearward horizontal upper frame node 2660 can be obtuse, for instance, ninety-five degrees.

As noted above, the first connection pad 2690 can be on a first side of the center upper frame node connection 265 and the second connection pad 2690 can be on a second side of the center upper frame node connection 265 opposite the first side. One of the connection pads 2690 can be fixed to a side frame connection boss 2264 of the center upper horizontal frame connection 225 via an elongate support member 203. Here, the elongate support member 203 can be fixed to (e.g., welded to) each of the side frame connection boss 2264 and the connection pad 2690 facing the side frame connection boss 2264. The elongate support member 203 can be regarded as a fourth frame tube. Further, the connection pad 2690 facing away from the side frame connection boss 2264 can be free of or without any connections, for instance, free of any welded attachments.

Turning now to FIGS. 4-7, each center upper frame node connection 265 can be a single (i.e., integral or unitary) casting. Further, the casting can have no hollow core. Put another way, each center upper frame node connection 265 can be coreless. This can mean that the body 2600 of each center upper frame node connection 265 can be free of any hollow portions, for instance, at any of the frame nodes 2650, 2660, 2670, 2680 and either of the first and second connection pads 2690. That is, at least the ends of the frame nodes 2650, 2660, 2670, 2680 and the first and second connection pads 2690 can be solid, without any voids, openings, or hollow portions. According to one or more embodiments, all of the frame nodes 2650, 2660, 2670, 2680 and the first and second connection pads 2690 can be solid, without any voids, openings, or hollow portions. Further, optionally, all of the center upper frame node connection 265 can be solid and without voids, openings, or hollow portions.

According to one or more embodiments, the forward horizontal upper frame node 2650 can be square in an end view thereof. That is, at least an end portion 2652 can be square, for instance, in an end view of the forward horizontal upper frame node 2650. Optionally, the end portion 2652 can have a projection 2653. Generally, the end portion 2652 can be regarded as a machined weld joint.

Each of the rearward horizontal upper frame node 2660, the rearward angular upper frame node 2670, and/or the vertical upper frame node 2680 can be circular in an end view thereof. That is, at least an end portion 2662 of the rearward horizontal upper frame node 2660, at least an end portion 2672 of the rearward angular upper frame node 2670, and/or at least an end portion 2682 of the vertical upper frame node 2680 can be circular, for instance, in respective end views of the of the rearward horizontal upper frame node 2660, the rearward angular upper frame node 2670, and the vertical upper frame node 2680. Optionally, the end portion 2662 of the rearward horizontal upper frame node 2660 can have a projection 2663, the end portion 2672 of the rearward angular upper frame node 2670 can have a projection 2673, and/or the end portion 2682 of the vertical upper frame node 2680 can have a projection 2683. Generally, each of the end portion 2662, the end portion 2672, and/or the end portion 2682 can be regarded as a machined weld joint. According to one or more embodiments, each of the frame nodes 2650, 2660, 2670, 2680 can taper from thick to thin at the respective end portions 2652, 2662, 2672, 2682, for instance, toward the body 2600.

Each of the first and second connection pads 2690 can be circular in a corresponding side elevational view of the center upper frame node connection 265. According to embodiments of the present disclosure, the first and second connection pads 2690 can be identical. Further, according to one or more embodiments of the present disclosure, the area defined by each of the first connection pad 2690 and the second connection pad 2690, as viewed from the side elevational view, can be greater than the area defined by each of the end portion 2662 of the rearward horizontal upper frame node 2660, the end portion 2672 of the rearward angular upper frame node 2670, and/or the end portion 2682 of the vertical upper frame node 2680, in respective end views of the of the rearward horizontal upper frame node 2660, the rearward angular upper frame node 2670, and the vertical upper frame node 2680.

Figure 6:
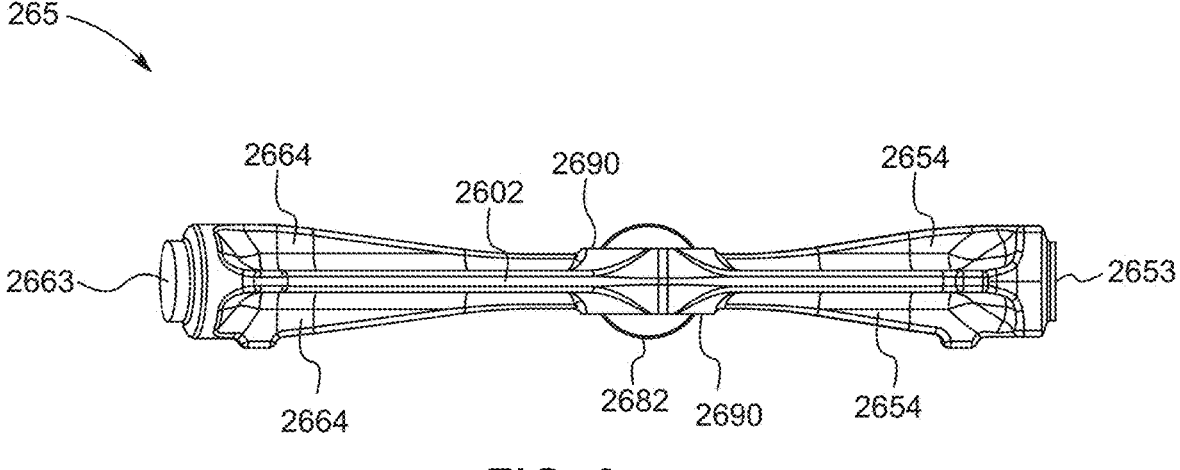
FIG. 6 is a top view of the frame node of FIG. 3.
Figure 7:
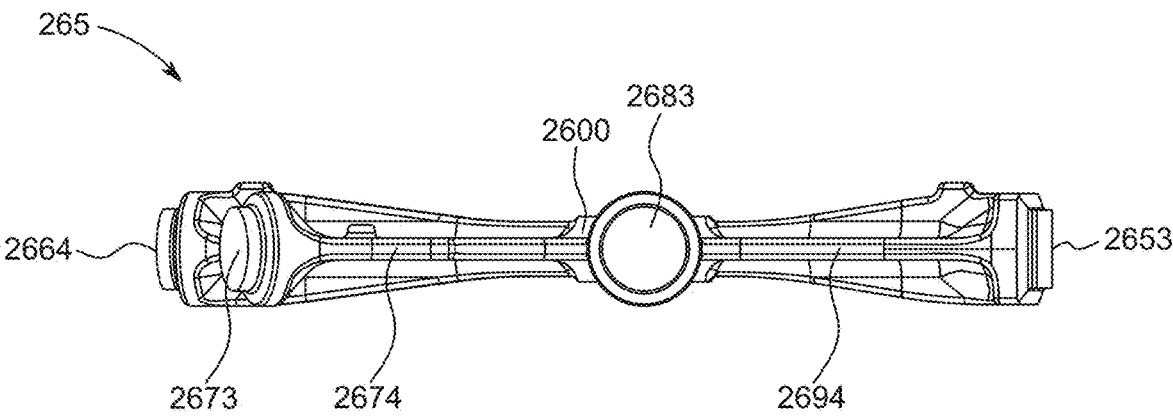
FIG. 7 is a bottom view of the frame node of FIG. 3.

In a plan view, such as the top plan view of FIG. 6 and the bottom plan view of FIG. 7, the first and second connection pads 2690 can face opposite directions. Thus, end surfaces or faces of the first and second connection pads 2690, which can be flat, can be parallel to each other. Further, according to one or more embodiments, the end portion 2663 of the rearward horizontal upper frame node 2660 and the end portion 2653 of the forward horizontal upper frame node 2650 can face in opposite directions. Thus, end faces or surfaces of the rearward horizontal upper frame node 2660 and the forward horizontal upper frame node 2650, which can be flat, can be parallel to each other. In view of the foregoing, according to one or more embodiments, each of the first and second connection pads 2690 can face a direction perpendicular to a direction in which the rearward horizontal upper frame node 2660 faces and/or in which the forward horizontal upper frame node 2650 faces.

Figure 4:
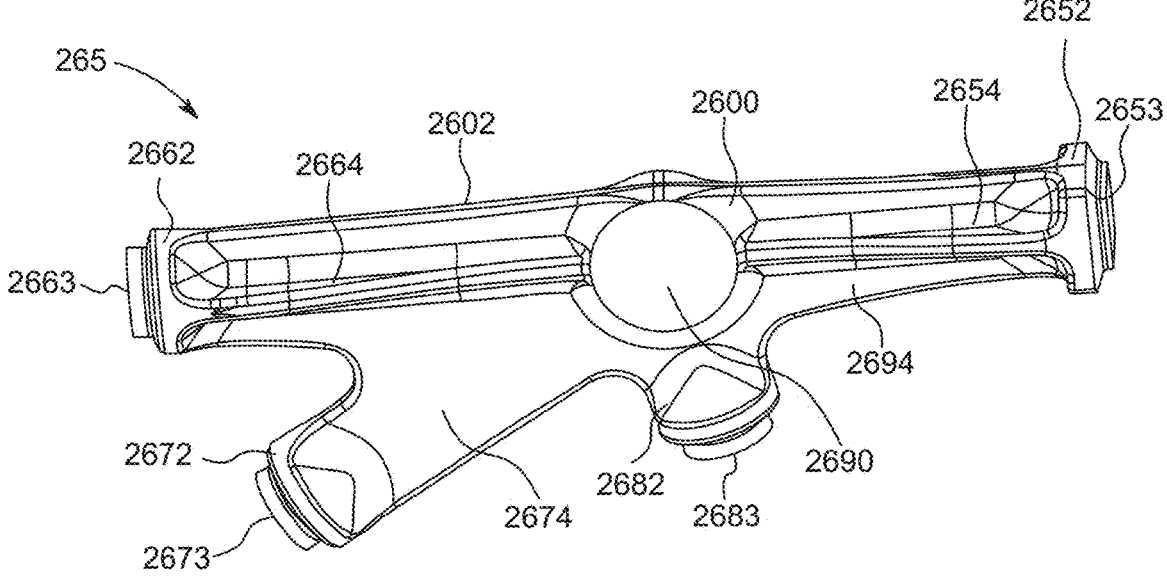
FIG. 4 is a side view of the frame node of FIG. 3 from a first side thereof.
Figure 5:
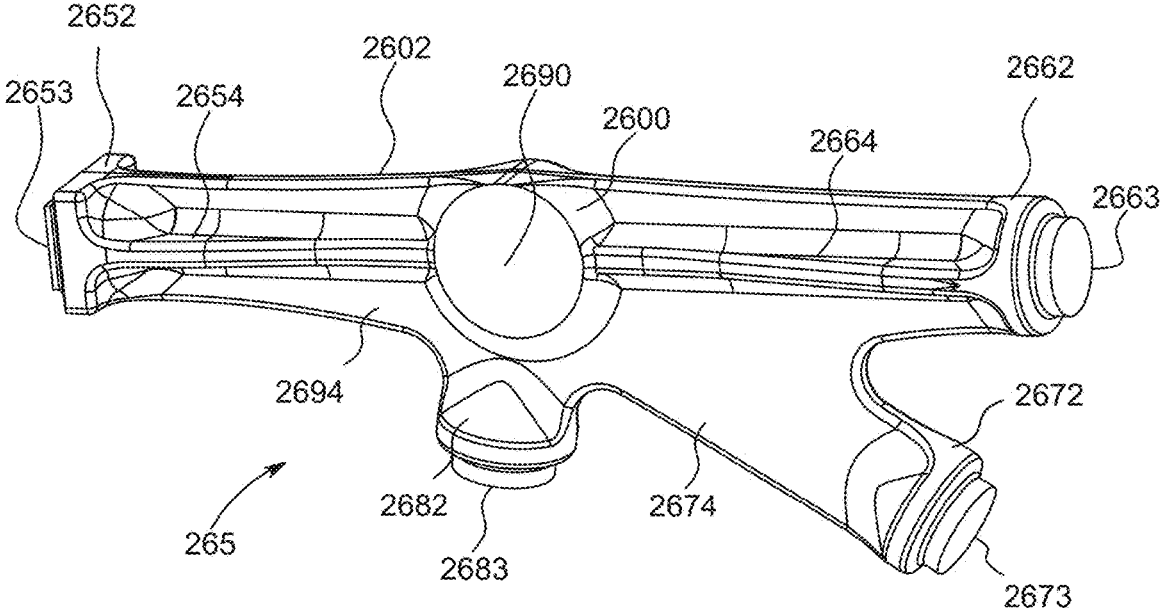
FIG. 5 is a side view of the frame node of FIG. 3 from a second side thereof opposite the first side.

Still referring to FIGS. 4-7, a first pair of ribs 2654 can be provided between the forward horizontal upper frame node 2650 and the first and second connection pads 2690. A second pair of ribs 2664 can be provided between the rearward horizontal upper frame node 2660 and the first and second connection pads 2690. Each rib 2654, 2664, which may be regarded as stiffeners, can, according to one or more embodiments, extend from respective ones of first and second connection pads 2690 to a corresponding one of the forward horizontal upper frame node 2650 and the rearward horizontal upper frame node 2660. Incidentally, a spine 2602 may extend from the end portion 2652 of the forward horizontal upper frame node to the end portion 2662 of the rearward horizontal upper frame node 2660, such as shown in FIGS. 4-6.

According to one or more embodiments, a web 2674 can be implemented between the rearward horizontal upper frame node 2660 and the rearward angular upper frame node 2670, such as shown in FIG. 4 and FIG. 5. Additionally or alternatively, a web 2694 can be implemented between the forward horizontal upper frame node 2650 and the vertical upper frame node 2680, such as shown in FIG. 4 and FIG. 5.

INDUSTRIAL APPLICABILITY

As noted above, embodiments of the present disclosure can involve or be directed to one or more center upper frame node connections, and systems, components, and methods thereof.

Generally speaking, embodiments of the disclosed subject matter can provide a lightweight, durable machine configuration with a reliable support definition of load points between the dump body 30 and the space frame 20, for instance, in light of dimensional variations due to tolerances and/or component deflection.

Also, tubular structures can provide lightweight structures, however, some nodes where multiple tubes come together (i.e., tube-to-tube fabricated node) may only be able to be welded by hand and, furthermore, can be very complicated and difficult to weld.

According to one or more embodiments of the present disclosure, generally speaking, a casting can replace the relatively complicated tube-to-tube fabricated node. Castings according to one or more embodiments of the present disclosure can allow a mechanized orbital welding process, for instance, using an automated orbital welding machine, to replace some or all manual welding. For instance, automated orbital welding can be implemented on all circular joints. The casting can be common for both the left-hand (LH) and right-hand (RH) sides of the space frame. That is, the casting, according to embodiments of the present disclosure, can be symmetrical in a top plan view and/or a bottom plan view. Further, no cores may be used in the casting. Such casting, particularly the solid and coreless nature of the casting at the end portions of the casting, can provide less chance for variability in sidewalls at the end portions.

According to one or more embodiments of the present disclosure, a space frame, such as space frame 20, or portion thereof, such as a center upper frame node connection, for instance, center upper frame node connection 265, can be provided or implemented (including assembled fully or partially). As noted above, the center upper frame node connection 265 can have the forward horizontal upper frame node 2650, the rearward horizontal upper frame node 2660, the rearward angular upper frame node 2670, the vertical upper frame node 2680, and the pair of contact or connection pads 2690 on opposite sides thereof.

A plurality of elongate support members, such as frame tubes 201, 203, can also be provided or implemented, for fixedly attaching (e.g., via welding) to the center upper frame node connection 265. A center upper horizontal frame connection, such as center upper horizontal frame connection 225, can also be provided or implemented, also for fixedly attaching (e.g., via welding) to the center upper frame node connection 265. Here, the center upper horizontal frame connection 225 can be directly fixed to the center upper horizontal frame connection 225.

The frame tubes 201 can be fixed (e.g., welded) to corresponding ones of the rearward horizontal upper frame node 2660, the rearward angular upper frame node 2670, and the vertical upper frame node 2680. Such welding can be performed using an automated welding machine, such as a mechanized orbital welding machine. The frame tube 203 can also be fixed (e.g., welded) to one of the connection pads 2690. Such welding can also be performed using the automated welding machine. The other connection pad 2690 may be free or entirely exposed. The forward horizontal upper frame node 2650 can be fixed (e.g., welded) to the enter upper frame node connection 265, such as shown in FIG. 3.

Embodiments of the disclosed subject matter can also be as set forth according to the following parentheticals.

(1) A space frame for an off-highway rear haul truck comprising: a first center upper frame node casting; and a second center upper frame node casting spaced from the first center upper frame node casting in a width direction of the space frame, wherein each of the first and second center upper frame node castings are coreless and include: a forward horizontal upper frame node oriented in a first forward direction and configured to weldably attach to a center upper horizontal frame connection, a rearward horizontal upper frame node oriented in a first rearward direction and configured to weldably attach a first frame tube, a rearward angular upper frame node oriented in a second rearward direction and a first downward direction and configured to weldably attach a second frame tube, a vertical upper frame node oriented in a second downward direction and configured to weldably attach a third frame tube, and a first connection pad on a first side of the upper frame node casting and a second connection pad on a second side on upper frame node casting opposite the first side, one of the first connection pad or the second connection pad being configured to weldably attach a fourth frame tube, and the other of the first connection pad or the second connection pad being configured to remain free of any welded attachments, and wherein coreless means that at least each of the first and second center upper frame node castings has a body free of any hollow portions at any of the frame nodes and either of the first and second connection pads.

(2) The space frame according to (1), wherein for each of the first and second center upper frame node castings: each of the rearward horizontal upper frame node, the rearward angular upper frame node, and the vertical upper frame node is circular in an end view thereof, the forward horizontal upper frame node is square in an end view thereof, and each of the first and second pads is circular in a corresponding side elevational view of the first or the second center upper frame node casting.

(3) The space frame according to (1) or (2), wherein each of the first and second center upper frame node castings has a K-shape in a side elevational view thereof.

(4) The space frame according to any one of (1) to (3), wherein each of the first and second center upper frame node castings is symmetrical in an overhead plan view thereof.

(5) The space frame according to any one of (1) to (4), wherein, for each of the first and second center upper frame node castings, an angle between the rearward horizontal upper frame node and the rearward angular upper frame node is acute.

(6) The space frame according to any one of (1) to (5), wherein, for each of the first and second center upper frame node castings, an angle between the forward horizontal upper frame node and the vertical upper frame node is acute.

(7) The space frame according to any one of (1) to (6), wherein each of the first and second center upper frame node castings includes: a first pair of ribs extending from the forward horizontal upper frame node to the first and second connection pads on the first and second sides of the upper frame node casting, and a second pair of ribs extending from the rearward horizontal upper frame node to the first and second connection pads on the first and second sides of the upper frame node casting.

(8) The space frame according to any one of (1) to (7), wherein each of the first and second center upper frame node castings includes a web between the rearward horizontal upper frame node and the rearward angular upper frame node.

(9) The space frame according to any one of (1) to (8), wherein in a top plan view of each of the first and second center upper frame node castings, each of the first and second connection pads faces a direction perpendicular to a direction in which the rearward horizontal upper frame node faces and/or in which the forward horizontal upper frame node faces.

(10) A center upper frame node casting comprising: a forward horizontal upper frame node oriented in a first forward direction; a rearward horizontal upper frame node oriented in a first rearward direction opposite the first forward direction; a rearward angular upper frame node oriented in a second rearward direction and a first downward direction, a vertical upper frame node oriented in a second downward direction; and a first connection pad on a first side of the upper frame node casting and a second connection pad on a second side on upper frame node casting opposite the first side, wherein the center upper frame node casting is coreless, without any hollow portions at any of the frame nodes and either of the first and second connection pads.

(11) The center upper frame node casting according to (10), wherein each of the rearward horizontal upper frame node, the rearward angular upper frame node, and the vertical upper frame node is circular in an end view thereof, wherein the forward horizontal upper frame node is square in an end view thereof, wherein each of the first and second pads is circular in a corresponding side elevational view of the center upper frame node casting, and wherein a first area of each of the first and second pads is greater than a second area of each of the rearward horizontal upper frame node, the rearward angular upper frame node, and the vertical upper frame node.

(12) The center upper frame node casting according to (10) or (11), wherein a first angle between the rearward horizontal upper frame node and the rearward angular upper frame node is acute, wherein a second angle between the forward horizontal upper frame node and the vertical upper frame node is acute, and wherein the second angle is greater than the first angle.

(13) The center upper frame node casting according to any one of (10) to (12), further comprising a pair of ribs between the forward horizontal upper frame node and the first and second connection pads on the first and second sides of the upper frame node casting.

(14) The center upper frame node casting according to any one of (10) to (13), further comprising a pair of ribs extending between the rearward horizontal upper frame node and the first and second connection pads on the first and second sides of the upper frame node casting.

(15) The center upper frame node casting according to any one of (10) to (14), further comprising a web between the rearward horizontal upper frame node and the rearward angular upper frame node.

(16) The center upper frame node casting according to any one of (10) to (15), wherein the first and second connection pads face opposite directions such that respective end faces thereof are parallel to each other, and wherein the rearward horizontal upper frame node and the forward horizontal upper frame node face opposite directions such that end faces thereof are parallel to each other.

(17) A method comprising: providing a center upper frame node connector of a space frame; and providing a plurality of frame tubes, including a first frame tube, a second frame tube, a third frame tube, and a fourth frame tube, wherein the center upper frame node connector includes: a forward horizontal upper frame node oriented in a first forward direction and configured to weldably attach to a center upper horizontal frame connection of the space frame, a rearward horizontal upper frame node oriented in a first rearward direction and configured to weldably attach the first frame tube, a rearward angular upper frame node oriented in a second rearward direction and a first downward direction and configured to weldably attach the second frame tube, a vertical upper frame node oriented in a second downward direction and configured to weldably attach the third frame tube, and a first connection pad on a first side of the center upper frame node connector and a second connection pad on a second side on center upper frame node connector opposite the first side, at least one of the first connection pad or the second connection pad being configured to weldably attach the fourth frame tube, and wherein the center upper frame node connector is coreless, without any hollow portions at any of the frame nodes and either of the first and second connection pads.

(18) The method according to (17), wherein each of the rearward horizontal upper frame node, the rearward angular upper frame node, and the vertical upper frame node is circular in an end view thereof, and wherein the method further comprises welding, using an automated welding machine, the rearward horizontal upper frame node to the first frame tube, the rearward angular upper frame node to the second frame tube, and/or the vertical upper frame node to the third frame tube.

(19) The method according to (17) or (18), wherein the forward horizontal upper frame node is square in an end view thereof, and wherein the method further comprises welding the forward horizontal upper frame node to the center upper horizontal frame connection of the space frame.

(20) The method according to any one of (17) to (19), wherein a first angle between the rearward horizontal upper frame node and the rearward angular upper frame node is acute, wherein a second angle between the forward horizontal upper frame node and the vertical upper frame node is acute, wherein the second angle is greater than the first angle, and wherein the center upper frame node connector further includes: a first pair of ribs between the forward horizontal upper frame node and the first and second connection pads on the first and second sides of the center upper frame node connector, and a second pair of ribs between the rearward horizontal upper frame node and the first and second connection pads on the first and second sides of the center upper frame node connector.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A space frame for an off-highway rear haul truck comprising
   a first center upper frame node casting oriented vertically; and
   a second center upper frame node casting oriented vertically and spaced from the first center upper frame node casting in a width direction of the space frame,
   wherein each of the first and second center upper frame node castings are coreless and include:
   a forward horizontal upper frame node oriented in a first forward direction and configured to weldably attach to a center upper horizontal frame connection,
   a rearward horizontal upper frame node oriented in a first rearward direction and configured to weldably attach a first frame tube,
   a rearward angular upper frame node oriented in a second rearward direction and a first downward direction and configured to weldably attach a second frame tube,
   a vertical upper frame node oriented in a second downward direction and configured to weldably attach a third frame tube, and
   a first connection pad on a first side of the upper frame node casting and a second connection pad on a second side on upper frame node casting opposite the first side, one of the first connection pad or the second connection pad being configured to weldably attach a fourth frame tube, and the other of the first connection pad or the second connection pad being configured to remain free of any welded attachments, and
   wherein the first connection pad on the first side of the first center upper frame node casting is axially aligned in the width direction with the second connection pad on the second side of the second center upper frame node casting, and
   wherein coreless means that at least each of the first and second center upper frame node castings has a body free of any hollow portions at any of the frame nodes and either of the first and second connection pads.

2. The space frame according to claim 1, wherein for each of the first and second center upper frame node castings:
   each of the rearward horizontal upper frame node, the rearward angular upper frame node, and the vertical upper frame node is circular in an end view thereof,
   the forward horizontal upper frame node is square in an end view thereof, and
   each of the first and second pads is circular in a corresponding side elevational view of the first or the second center upper frame node casting.

3. The space frame according to claim 1, wherein each of the first and second center upper frame node castings has a K-shape in a side elevational view thereof.

4. The space frame according to claim 1, wherein the first and second center upper frame node castings are symmetrically attached to the space frame in an overhead plan view thereof.

5. The space frame according to claim 1, wherein, for each of the first and second center upper frame node castings, an angle between the rearward horizontal upper frame node and the rearward angular upper frame node is acute.

6. The space frame according to claim 1, wherein, for each of the first and second center upper frame node castings, an angle between the forward horizontal upper frame node and the vertical upper frame node is acute.

7. The space frame according to claim 1, wherein each of the first and second center upper frame node castings includes:

a first pair of ribs extending from the forward horizontal upper frame node to the first and second connection pads on the first and second sides of the upper frame node casting, and a second pair of ribs extending from the rearward horizontal upper frame node to the first and second connection pads on the first and second sides of the upper frame node casting.

8. The space frame according to claim 1, wherein each of the first and second center upper frame node castings includes a web between the rearward horizontal upper frame node and the rearward angular upper frame node.

9. The space frame according to claim 1, wherein in a top plan view of each of the first and second center upper frame node castings, each of the first and second connection pads faces a direction perpendicular to a direction in which the rearward horizontal upper frame node faces and/or in which the forward horizontal upper frame node faces.

10. A center upper frame node casting comprising:

a body;

a forward horizontal upper frame node extending from the body in a first forward direction;

a rearward horizontal upper frame node extending from the body in a first rearward direction opposite the first forward direction;

a rearward angular upper frame node extending from the body in a second rearward direction and a first downward direction;

a vertical upper frame node extending from the body in a second downward direction; and a first connection pad on a first side of the body of the upper frame node casting and a second connection pad on a second side of the body of the upper frame node casting opposite the first side of the body, wherein the center upper frame node casting is coreless, without any hollow portions at any of the frame nodes and either of the first and second connection pads, wherein a first angle between the rearward horizontal upper frame node and the rearward angular upper frame node is acute, wherein a second angle between the forward horizontal upper frame node and the vertical upper frame node is acute, wherein a third angle between the vertical upper frame node and the rearward angular upper frame node is acute, and wherein each of the second angle and the third angle is greater than the first angle.

11. The center upper frame node casting according to claim 10, wherein each of the rearward horizontal upper frame node, the rearward angular upper frame node, and the vertical upper frame node is circular in an end view thereof, wherein the forward horizontal upper frame node is square in an end view thereof, wherein each of the first and second pads is circular in a corresponding side elevational view of the center upper frame node casting, and wherein a first area of each of the first and second pads is greater than a second area of each of the rearward horizontal upper frame node, the rearward angular upper frame node, and the vertical upper frame node.

12. The center upper frame node casting according to claim 10, further comprising a pair of ribs between the forward horizontal upper frame node and the first and second connection pads on the first and second sides of the upper frame node casting.

13. The center upper frame node casting according to claim 10, further comprising a pair of ribs extending between the rearward horizontal upper frame node and the first and second connection pads on the first and second sides of the upper frame node casting.

14. The center upper frame node casting according to claim 10, further comprising a web between the rearward horizontal upper frame node and the rearward angular upper frame node.

15. The center upper frame node casting according to claim 10, wherein the first and second connection pads face opposite directions such that respective end faces thereof are parallel to each other, and wherein the rearward horizontal upper frame node and the forward horizontal upper frame node face opposite directions such that end faces thereof are parallel to each other.

16. A method comprising:

providing a center upper frame node connector of a space frame, and providing a plurality of frame tubes, including a first frame tube, a second frame tube, a third frame tube, and a fourth frame tube, wherein the center upper frame node connector includes:

a forward horizontal upper frame node oriented in a first forward direction and configured to weldably attach to a center upper horizontal frame connection of the space frame, a rearward horizontal upper frame node oriented in a first rearward direction and configured to weldably attach the first frame tube, a rearward angular upper frame node oriented in a second rearward direction and a first downward direction and configured to weldably attach the second frame tube, a vertical upper frame node oriented in a second downward direction and configured to weldably attach the third frame tube, and a first connection pad on a first side of the center upper frame node connector and a second connection pad on a second side on center upper frame node connector opposite the first side, each of the first connection pad and the second connection pad being configured to weldably attach the fourth frame tube individually thereto, wherein the center upper frame node connector is coreless, without any hollow portions at any of the frame nodes and either of the first and second connection pads, and wherein the center upper frame node connector further includes:

a first pair of ribs between the forward horizontal upper frame node and the first and second connection pads on the first and second sides of the center upper frame node connector, and a second pair of ribs between the rearward horizontal upper frame node and the first and second connection pads on the first and second sides of the center upper frame node connector.

17. The method according to claim 16, wherein each of the rearward horizontal upper frame node, the rearward angular upper frame node, and the vertical upper frame node is circular in an end view thereof, and wherein the method further comprises welding, using an automated welding machine, the rearward horizontal upper frame node to the first frame tube, the rearward angular upper frame node to the second frame tube, and/or the vertical upper frame node to the third frame tube.

18. The method according to claim 16, wherein the forward horizontal upper frame node is square in an end view thereof, and wherein the method further comprises welding the forward horizontal upper frame node to the center upper horizontal frame connection of the space frame.

19. The method according to claim 16, wherein a first angle between the rearward horizontal upper frame node and the rearward angular upper frame node is acute, wherein a second angle between the forward horizontal upper frame node and the vertical upper frame node is acute, and wherein the second angle is greater than the first angle.

20. The center upper frame node casting according to claim 10, wherein the body is free of any upper frame nodes extending therefrom horizontally or vertically above the body, the forward horizontal upper frame node, and the rearward horizontal upper frame node.

* * * * *